Sept. 20, 1955 G. E. KENNEDY 2,718,579
STUD WELDING DEVICE
Filed Jan. 8, 1953

INVENTOR.
George E. Kennedy
BY Clyde H. Haynes
his atty

United States Patent Office 2,718,579
Patented Sept. 20, 1955

2,718,579
STUD WELDING DEVICE

George E. Kennedy, Pasadena, Calif., assignor to Gregory Industries, Inc., Detroit, Mich., a corporation of Michigan Application January 8, 1953, Serial No. 330,233

8 Claims. (Cl. 219—4)

This invention relates to a stud welding device and in particular to a device which has a pair of stud receiving chucks; one, to hold the stud to be welded and the other, to receive a previously welded stud.

In the building construction there is a trend towards making large wall panels of poured concrete with small metal plates imbedded in the concrete. After the concrete has hardened, the wall is tilted into place against an I-beam or other similar structure. A pair of studs spaced evenly are then welded to this plate imbedded in the concrete and a large washer or holding plate inserted over both studs and held thereon by nuts, holds the concrete wall against the column. Although the whole operation appears relatively simple, the major problem occurred during the welding of the studs to the imbedded plates. In the stud welding process it is necessary to have an electrical arc between the stud being welded and the plate, thus, it was necessary to provide a means for grounding the plate to one side of the welding generator. Since the plate was only a few inches square and was completely imbedded in concrete, ordinary grounding connections could not be used. Another problem which occurred was that of spacing the studs an equal distance from each other on all of the plates and also hold all studs the same distance from the I-beam so that the holding washers or plates would fit the studs.

One of the objects of the invention is to provide a stud welding device with a reciprocable chuck and a stationary chuck wherein the stationary chuck is adapted to engage a previously welded stud and the reciprocable chuck is adapted to engage and hold a stud being welded.

Another object of the invention is to provide a stud welding device with means for spacing studs on a plate and for grounding the plate during the welding operation.

A further object of the invention is to provide a stud welding device with a stationary chuck adapted to receive a previously welded stud and with a movable chuck adapted to hold a stud for welding wherein the chucks are spaced apart in parallel alignment.

Other objects and a fuller understanding of the invention may be had by referring to the following description and claims when taken in conjunction with the drawings in which:

Figure 1:
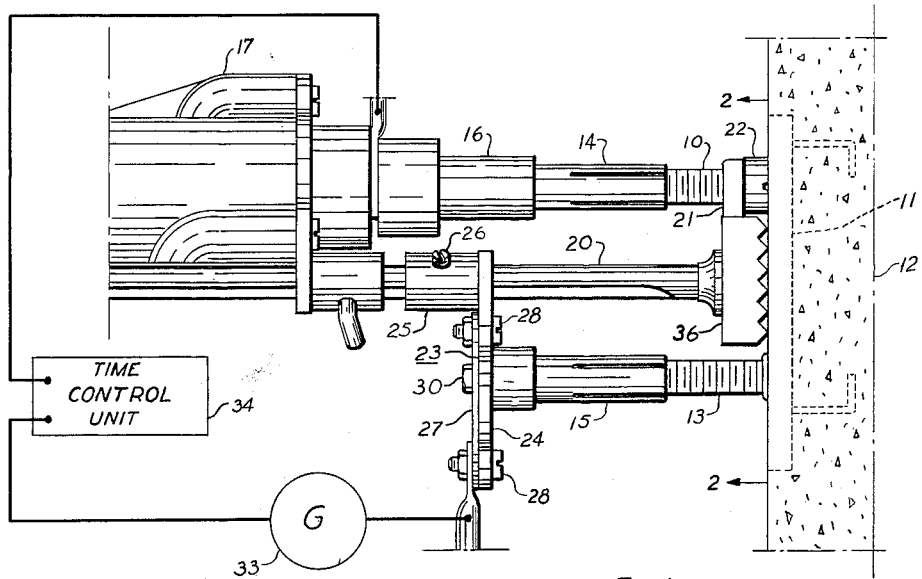
Fig. 1 is an elevational view of the stud welding device.
Figure 2:
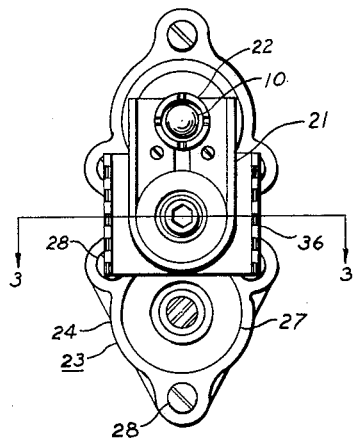
Fig. 2 is an end view of the gun taken along the lines 2—2 of Figure 1.

The stud welding gun or device is illustrated in Figure 1 positioned to weld a stud 10 to a plate 11 imbedded in concrete or other electrical insulation material 12. The plate 11 has a previously welded stud 13 secured thereto. The stud 10 which is being welded to the plate 11 is held by a movable or reciprocable chuck 14 and the previously welded stud 13 is received by a stationary chuck 15. The chucks 14 and 15 are electrically insulated from each other and are spaced parallel to each other. A movable chuck carrier 16 is slidable in a dielectric gun body 17 and carries the movable chuck 14 towards and away from the dielectric gun body 17. The stationary chuck 15 is also mounted on this dielectric gun body 17 and does not move relative thereto during welding.

It is understood that there are different methods of moving the movable chuck 14 towards the body 17 to permit an arc between the stud 10 to be welded and the plate 11, and to move the chuck 14 away from the body 17 to move the stud 10 to the plate upon completion of an arc. The mechanism for reciprocally moving the chuck carrier 16 and the movable chuck 14 therewith is not illustrated or described in the drawing or description. One of these mechanisms is completely described and illustrated in a Patent No. 2,413,189 issued December 24, 1946, to T. Nelson, entitled "Stud Welding Machine."

Mounted on the dielectric gun body 17 is a leg 20 which extends parallel to and spaced from and along side of the movable chuck 14 and a stud 10 carried thereby. This leg 20 terminates in a foot 21 which supports a ferrule 22 in axial alignment with the movable chuck 14 and around the welding end of a stud 10 which is to be welded to plate 11. A very simple and yet practical method of mounting the stationary chuck 15 on the dielectric gun body 17 is by using a bracket 23 adjustably secured to the leg 20. The leg 20 is electrically isolated from the chuck carrier 16 and the movable chuck 14 by the dielectric body 17. Stationary chuck 15 is electrically connected with the leg 20 through the bracket 23.

The bracket 23 may be easily constructed from a plate 24 extended transversely of the leg 20 and provided with a bushing 25 for mounting the plate 24 on the leg 20. The bracket 23 may be adjustably moved along the leg 20 by loosening and then retightening the set screw 26. Once the position of the bracket 23 which supports the stationary chuck 15 is determined to position the stationary chuck 15 relative to the gun body 17 the set screw is tightened. After the set screw has been tightened the stationary chuck 15 remains in position relative to the gun body 17 throughout succeeding welding operations.

It may become desirable to change the distance between the movable chuck 14 and the stationary chuck 15 when moving from one job to another. For this reason the bracket 23 is provided with a member 27, the plan view of which is in Figure 4. This member 27 may be fastened to the bracket 23 by bolts 28 extending through openings 29. The stationary chuck 15 is secured to the member 27 by a screw 30 extending through an opening 31 in the member 27. If the spacing between the chucks 14 and 15 should be changed from one job to another it is only necessary to remove member 27 and insert a new member 27 having the screw opening 31 in a different location. The hole 31 may also be elongated to allow for this adjustment.

After a previously welded stud 13 has been welded to plate 11 each succeeding stud to be welded may easily be spaced correctly from the preceding or previously welded stud. In actual operation a stud 10 to be welded is inserted in the movable chuck 14 and a ferrule 22 is inserted in the foot 21. The stud welding gun or device is then positioned with the stud to be welded and the ferrule 22 abutted against the plate 11 and with the stationary chuck 15 receiving the previously welded stud 13. The operator then pushes a trigger (not shown) which energizes the welding circuit. As is shown diagrammatically in Figure 1 a generator 33, a time-controlled switch unit 34, movable chuck 14, stud to be welded 10, plate 11 imbedded in the concrete, previously welded stud 13, stationary chuck 15, and the bracket 23 are electrically connected in series during the welding operation by suitable welding cable. The time-control unit 34 regulates the duration of a flow of current thus regulating the duration of an arc formed between the stud 10 and the plate 11. Details of this time-control unit and circuit are not illustrated since they are old in the art as demonstrated by the before mentioned Patent No. 2,413,189. By having the chucks 14 and 15 electrically isolated from each other and spaced in parallel alignment the stud 10 will be welded at the correct distance from and parallel to the stud 13. Since the movable chuck 14 is movable relative to the dielectric gun body 17 while the chuck 15 is held stationary relative thereto the stud 10 may be lifted and plunged to the plate 11 during the weld cycle.

Figures 3, 4:
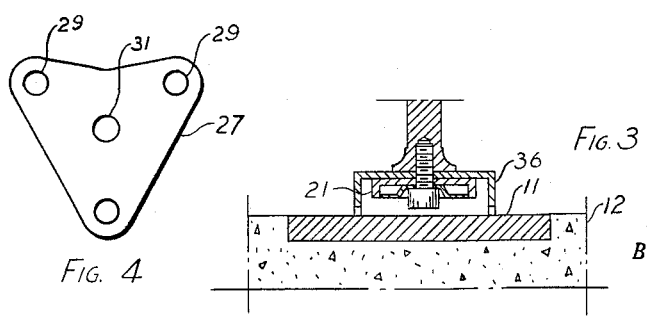
Fig. 3 is a fragmentary sectional view along the lines of 3—3 of Figure 2.
Fig. 4 is a plan view of the member which holds the stationary chuck.

The problem of welding the very first stud to the plate 11 was solved by providing the leg 20 with a channel-shaped shoe 36. This shoe 36 may be secured to the leg 20 along with the foot 21 by a screw as illustrated in Figure 3. The shoe is dimensioned so that it will seat against the plate 11 while the ferrule 22 is seated against the plate 11. Thus during welding of the first stud to the plate 11 electrical current flows through the stud 10, the plate 11, back through the shoe 36, leg 20, then through the bracket to the generator. Using this shoe 36 for the first weld does not always guarantee a good weld on the first stud, however, the weld is sufficient so that the next succeeding stud will be welded properly to the plate 11. If necessary, the first or previously welded stud may then be removed and a new stud welded in its place using the previous soundly welded stud for the stud 13 as hereinbefore described. Another advantage obtained from the shoe 36 is that it may also be used as a spacing guide during the welding of the stud. For example, after the tilt-up concrete panel is in place alongside the column, it is a simple matter to abut one side of the shoe against the column to space both studs 10 and 13 at the correct distance from the column; thus after the washer or other suitable apertured plate member has been placed over the studs which have been welded to the plate 11 and the nuts run down this member will overlap the column the correct distance to securely hold the concrete panel in place.

The drawings illustrate a specific design of the invention intended to weld studs at a particular distance apart and on an imbedded plate. It is understood that chucks of various sizes and types may be used to accommodate studs of various sizes and types. Also the foot or shoe and other parts may be redesigned to meet specific conditions without changing from the spirit and scope of the invention, therefore, the foregoing description and the drawings are by way of example and a full scope of the invention is defined in the following claims in which what is claimed is:

1. In a stud welding device, the provision of a body of dielectric material, a reciprocable chuck carrier slidable in said body and adapted to be electrically connected to one side of a source of welding current, a first stud receiving chuck on said chuck carrier, a second stud receiving chuck in electrically isolated parallel spaced relation to said first chuck and adapted to be electrically connected to the opposite side of said source of welding current a ferrule holder positioned to support a ferrule at the welding end of a stud carried by the first chuck, and means stationarily mounting said second chuck and said ferrule holder on said dielectric body.

2. In a stud welding device, the provision of a body of dielectric material, a reciprocable chuck carrier slidable in said body and adapted to be electrically connected to one side of a source of welding current, a first stud receiving chuck on said chuck carrier, a ferrule supporting leg adjustably mounted on said dielectric body in electrically isolated spaced parallel relation to said first chuck and adapted to hold a welding ferrule in axial alignment with said first chuck, a second stud receiving chuck carried by said leg in spaced parallel relation to said first chuck to receive a previously welded stud, and means electrically connecting said second chuck to the opposite side of said source of welding current.

3. In a stud welding device, a movable and a stationary stud receiving chuck electrically insulated from each other, a dielectric body for supporting said chucks at a definite spaced distance from each other and in parallel relationship, means for connecting said chucks to opposite sides of a source of welding current, adjustable leg means on said body extending outwardly beyond the chucks and including a stud welding ferrule axially aligned with the movable chuck, said leg means also including an electrically conductive part abuttable against the work to which a stud is to be welded to position said body at a definite distance from the work, said part being electrically connected to the stationary chuck and electrically insulated from the movable chuck.

4. The structure of claim 1 wherein said stud receiving chucks have similar dimensions whereby said second chuck grips a stud previously supported for welding by said first chuck.

5. The structure of claim 4 wherein said chucks extend substantially the same distance from the dielectric body.

6. A stud welding gun for welding a stud to an imbedded plate at a spaced distance from a previously welded stud, said gun comprising a body including a first chuck to receive a stud to be welded, a leg on said body insulated from said first chuck and terminating in a ground plate adjacent a stud placed in said first chuck, a member secured on one side thereof to said leg and adapted to be connected to a welding cable, a second chuck carried by said member in parallel alignment with said first chuck and adapted to receive a previously welded stud.

7. The structure of claim 1 wherein said ferrule holder and second chuck mounting means is adjustable.

8. In a stud welding device, the provision of a body of dielectric material, a reciprocable chuck carrier slidable in said body and adapted to be electrically connected to one side of a source of welding current, a first stud receiving chuck on said chuck carrier, a second stud receiving chuck in electrically isolated spaced relation to said first chuck and adapted to be electrically connected to the opposite side of said source of welding current, a ferrule holder positioned to support a ferrule at the welding end of a stud carried by the first chuck, and means stationarily mounting said second chuck and said ferrule holder on said dielectric body.

References Cited in the file of this patent

UNITED STATES PATENTS

| | | |
|---|---|---|
| 2,003,320 | Trainer et al. | June 4, 1935 |
| 2,159,059 | Trainer et al. | May 23, 1939 |
| 2,416,915 | Evans | Mar. 4, 1947 |

FOREIGN PATENTS

| | | |
|---|---|---|
| 871,795 | France | Jan. 22, 1942 |